United States Patent
Ku et al.

(10) Patent No.: US 7,259,606 B2
(45) Date of Patent: Aug. 21, 2007

(54) DATA SAMPLING CLOCK EDGE PLACEMENT TRAINING FOR HIGH SPEED GPU-MEMORY INTERFACE

(75) Inventors: Ting-Sheng Ku, San Jose, CA (US); Ashfaq R. Shaikh, San Jose, CA (US)

(73) Assignee: NVIDIA Corporation, Santa Clara, CA (US)

( * ) Notice: Subject to any disclaimer, the term of this patent is extended or adjusted under 35 U.S.C. 154(b) by 469 days.

(21) Appl. No.: 10/990,658

(22) Filed: Nov. 16, 2004

(65) Prior Publication Data

US 2005/0265064 A1 Dec. 1, 2005

Related U.S. Application Data

(60) Provisional application No. 60/539,787, filed on Jan. 27, 2004.

(51) Int. Cl.
*H03H 11/16* (2006.01)
(52) U.S. Cl. ...................... 327/235; 327/237
(58) Field of Classification Search .............. None
See application file for complete search history.

(56) References Cited

U.S. PATENT DOCUMENTS

| | | | | |
|---|---|---|---|---|
| 4,795,985 A | * | 1/1989 | Gailbreath, Jr. ............ | 327/158 |
| 6,154,498 A | * | 11/2000 | Dabral et al. ............... | 375/257 |
| 6,373,289 B1 | * | 4/2002 | Martin et al. ................. | 326/93 |
| 6,373,305 B1 | * | 4/2002 | Stine ........................... | 327/159 |
| 6,496,043 B1 | * | 12/2002 | Moss et al. ................... | 327/12 |
| 6,622,256 B1 | * | 9/2003 | Dabral et al. ............... | 713/600 |
| 6,889,334 B1 | * | 5/2005 | Magro et al. ............... | 713/500 |
| 6,940,768 B2 | * | 9/2005 | Dahlberg et al. ........... | 365/201 |
| 7,042,252 B2 | * | 5/2006 | Galloway et al. ............ | 327/16 |
| 7,187,598 B1 | * | 3/2007 | Daugherty et al. ......... | 365/194 |
| 7,210,050 B2 | * | 4/2007 | Dabral ....................... | 713/400 |

* cited by examiner

*Primary Examiner*—Cassandra Cox
(74) *Attorney, Agent, or Firm*—Townsend and Townsend and Crew LLP; J. Matthew Zigmant

(57) ABSTRACT

Circuits, methods, and apparatus for training a phase shift circuit to provide a phase shift for improved data recovery. A specific embodiment of the present invention provides a variable delay cell. A delay through the variable delay cell is changed while training patterns are received. The presence of errors in the received data pattern is tracked, and from the presence or absence of errors a preferred delay is selected and used for receiving data.

20 Claims, 9 Drawing Sheets

DATA SAMPLING CLOCK EDGE PLACEMENT TRAINING FOR HIGH SPEED GPU-MEMORY INTERFACE

RELATED APPLICATION

This application claims the benefit of U.S. provisional application No. 60/539,787, filed Jan. 27, 2004, which is incorporated by reference.

BACKGROUND

The present invention relates to high speed data interfaces in general, and more particularly to training a phase shift circuit used in a high speed interface.

In some high speed interface circuits, for example double data rate memory interfaces, a strobe signal is used for the timing and recovery of a number of data signals. That is, a transmitting circuit provides a number of data signals as well as a data strobe signal to a receiving circuit. This strobe signal may be transmitted such that its edges are aligned to edges or transitions of the data signals.

However, for proper data recovery, it is desirable for the strobe to be phase shifted relative to the received data, for example by ninety degrees. It is also desirable that this phase shift be done accurately to improve data recovery. It is further desirable that this shift be made automatically, for example at device power up or other appropriate time. By being made automatically, problems associated with manual adjustment, such as operator and other errors, are reduced or eliminated.

Thus, what is needed are circuits, methods, and apparatus for providing adjusting a phase shift in a high speed interface circuit. It is also desirable that this adjustment or training be performed automatically.

SUMMARY

Accordingly, embodiments of the present invention provide circuits, methods, and apparatus for training a phase shift circuit to provide a phase shift corresponding to improved data recovery. A specific embodiment of the present invention provides a variable delay cell. The delay through the variable delay cell is varied while training patterns are received by an integrated circuit. The presence of errors is tracked, and from the presence or absence of errors, a preferred delay is selected and used for receiving data.

A better understanding of the nature and advantages of the present invention may be gained with reference to the following detailed description and the accompanying drawings.

DESCRIPTION OF SPECIFIC EMBODIMENTS

Figure 1:
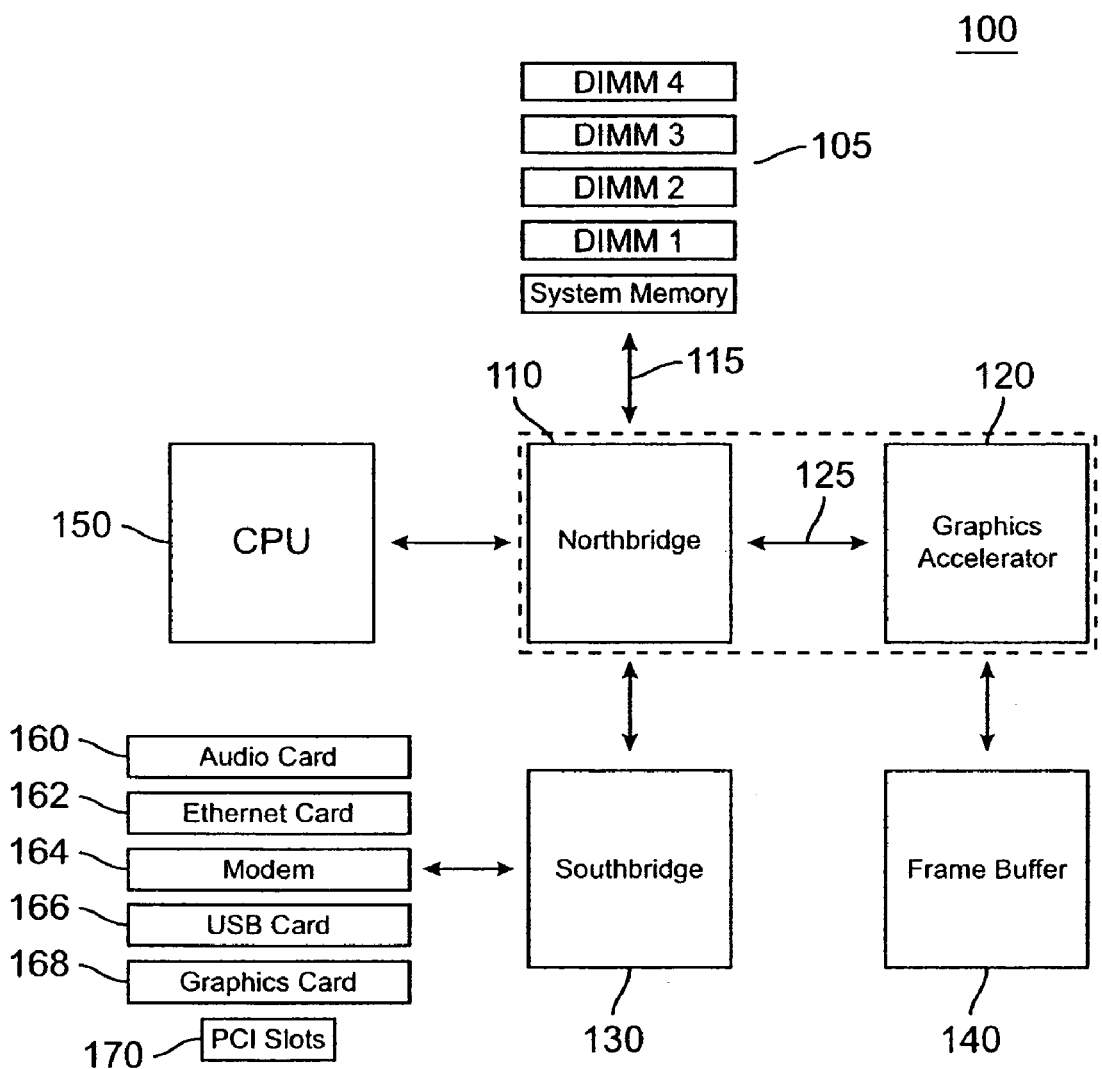
FIG. 1 is a block diagram of a computing system that benefits by incorporation of embodiments of the present invention.

FIG. 1 is a block diagram of a computing system 100 that benefits by incorporation of embodiments of the present invention. This computing system 100 includes a Northbridge 110, Southbridge 130, graphics accelerator 120, frame buffer 140, central processing unit (CPU) 150, audio card 160, Ethernet card 162, modem 164, USB card 166, graphics card 168, PCI slots 170, and memories 105. This figure, as with all the included figures, is shown for illustrative purposes only, and does not limit either the possible embodiments of the present invention or the claims.

The Northbridge 110 passes information from the CPU 150 to and from the memories 105, graphics accelerator 120, and Southbridge 130. Southbridge 130 interfaces to external communication systems through connections such as the universal serial bus (USB) card 166 and Ethernet card 162. The graphics accelerator 120 receives graphics information over the accelerated graphics port (AGP) bus 125 through the Northbridge 110 from CPU 150 and directly from memory or frame buffer 140. The graphics accelerator 120 interfaces with the frame buffer 140. Frame buffer 140 may include a display buffer that stores pixels to be displayed.

In this architecture, CPU 150 performs the bulk of the processing tasks required by this computing system. In particular, the graphics accelerator 120 relies on the CPU 150 to set up calculations and compute geometry values. Also, the audio or sound card 160 relies on the CPU 150 to process audio data, positional computations, and various effects, such as chorus, reverb, obstruction, occlusion, and the like, all simultaneously. Moreover, the CPU 150 remains responsible for other instructions related to applications that may be running, as well as for the control of the various peripheral devices connected to the Southbridge 130.

Figure 2:
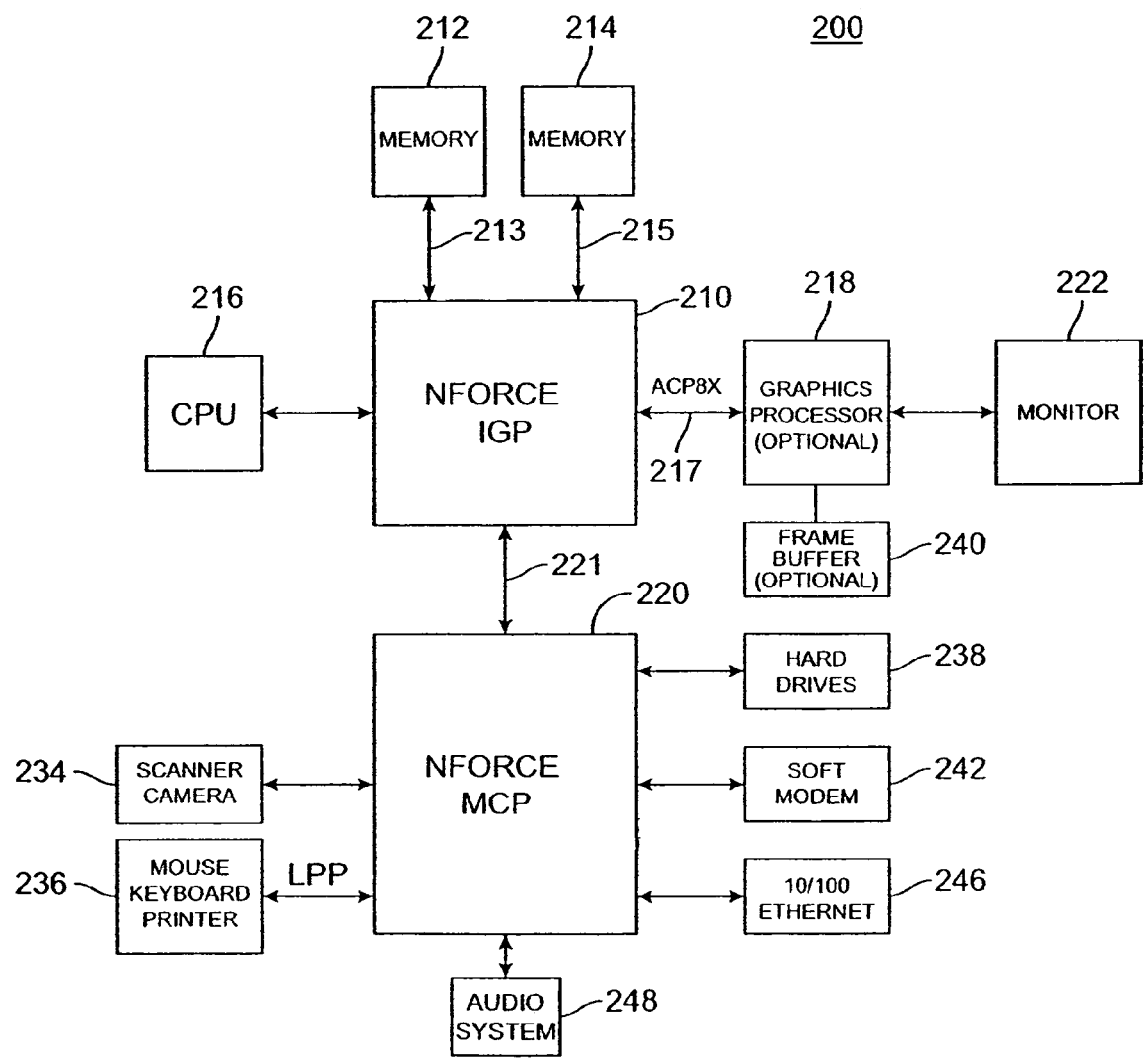
FIG. 2 is a block diagram of an improved computer system that benefits by incorporation of embodiments of the present invention.

FIG. 2 is a block diagram of an improved computer system 200 that benefits by incorporation of embodiments of the present invention. The improved computer system 200 includes an NVIDIA nForce™2 integrated graphics processor (IGP) 210, an nForce2 media communications processor (MCP2) 220, memory 212 and 214, CPU 216, optional graphics processor 218 and frame buffer 240, monitor 222, scanner or camera 234, mouse, keyboard, and printer 236, hard drives 238, soft modem 242, Ethernet network or LAN 246, and audio system 248.

This revolutionary system architecture has been designed around a distributed processing platform, which frees up the CPU to perform tasks best suited to it. Specifically, the nForce2 IGP 210 includes a graphics processing unit (GPU) (not shown) which is able to perform graphics computations previously left to the CPU 216. Alternately, the nForce2 IGP 210 may interface to an optional GPU 218 which performs these computations. Also, nForce2 MCP2 220 includes an audio processing unit (APU), which is capable of performing many of the audio computations previously done by the CPU 216. In this way, the CPU is free to perform its tasks more efficiently. Also, by incorporating a suite of networking and communications technologies such as USB and Ethernet, the nForce2 MCP2 220 is able to perform much of the communication tasks that were previously the responsibility of the CPU 216.

In this architecture, the nForce2 IGP 210 communicates with memories 212 and 214 over buses 213 and 215. The nForce2 IGP 210 also interfaces to an optional graphics processor 218 over an advanced AGP bus 217. In various computer systems, optional processor 218 may be removed, and the monitor 222 may be driven by the nForce2 IGP 210 directly. In other systems, there may be more than one monitor 222, some or all of which are coupled to optional graphics processor 218 or the nForce2 IGP 210 directly. The nForce2 IGP 210 communicates with the nForce2 MCP2 220 over a HyperTransport™ link 221. The optional graphics processor 218 may also interface with external memory, which is not shown in this example.

Embodiments of the present invention may be used to improve changes in the frequency of the clock signals at the interfaces to memories 212 and 214, from the optional graphics processor 218 to its external memory (not shown), or to other optional memories not shown here, or other memory interfaces or other circuits in other digital systems.

The nForce2 MCP2 220 contains controllers for Ethernet connections 246 and soft modem 242. The nForce2 MCP 220 also includes interfaces for a mouse, keyboard, and printer 236, and USB ports for cameras and scanners 234 and hard drives 238.

This arrangement allows the CPU 216, the nForce2 IGP 210, and the nForce2 MCP2 220, to perform processing independently, concurrently, and in a parallel fashion.

Embodiments of the present invention may be used to improve high-speed interfaces between devices, such as the interface between the graphics processor 120 and frame buffer 140 or the Northbridge 110 and memories 105 in FIG. 1, or between the integrated graphics processor 210 and memories 212 and 214 in FIG. 2.

Figure 3:
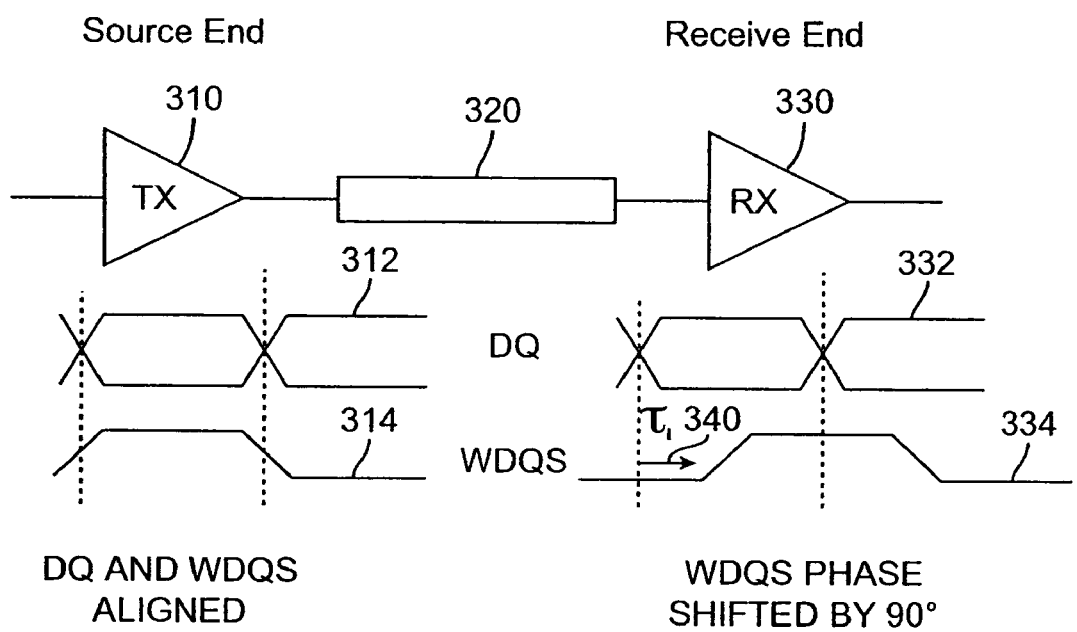
FIG. 3 is a simplified block diagram showing the relationship between data and associated strobe signals at the transmit and receiving ends of a high-speed interface that is consistent with an embodiment of the present invention.

FIG. 3 is a simplified block diagram showing the relationship between data and associated strobe signals at the transmit and receiving ends of a high-speed interface that is consistent with an embodiment of the present invention. The transmitters and receivers may be included in graphics processors, memories, or other integrated circuits. Typically each chip transmits and receives several data signals and at least one strobe signal. The transmitter 310 provides data and strobe signals over channel 320 to the receiver 330. At the transmitter or source end, the DQ 312 and WDQS strobe signals 314 are aligned. This means that the data and strobe signal edges toggle simultaneously, thus those signals experience similar coupled noise. Since the signals are aligned, they are subjected to similar simultaneous switching noise, which cause push-in and out and signal integrity distortions, thus causing skew between the data and associated strobe signals. Also, the data and associated strobe signals typically experience similar distortions due to coupling in the data channel 320 from other channels and noise sources.

The ideal phase shift for an interface such as the interface in FIG. 3 is not always exactly 90 degrees. Specifically, the optimum delay may be different from 90 degrees due to mismatches in the data channel 320 as seen by the data signal 312 and its strobe 314. Similarly the data signal 312 and strobe 314 may experience different noise and coupling. That is, not all of the noise experienced by these signals may be common mode-some of it may be differential. Similarly the variations in the data pattern results in intersymbol interference (ISI), which creates a data dependent skew in the edges of the data signal 312. Accordingly, it is desirable to optimize the phase shift during the manufacturing process, after the relevant circuits have been placed on a printed circuit board, for example. Again, conventionally this adjustment, if made at all, is typically done manually. This results in additional manufacturing costs and reduced reliability due to operator and other types of errors.

The channel 320 typically consists of a trace on a printed circuit board, along with integrated circuit bond wires an lead-frame pins.

At the receiving end, the strobe signal is phase shifted an amount T1 340, which is approximately equal to 90 degrees. In this way, the strobe signal is centered in the DQ data bit 332, thus providing recovery of the DQ 332 data.

The training sequence may be done at device power up, after a low-voltage drop out condition, after the device comes out of a low power mode, or at other times.

Figure 4:
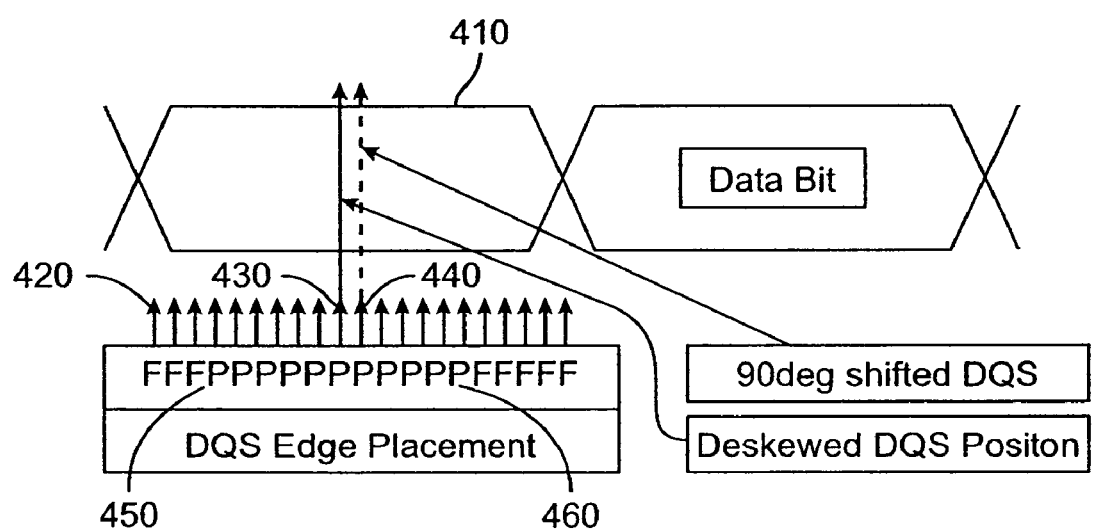
FIG. 4 illustrates a timing sequence that may be used to automatically adjust the phase shift between a strobe signal and a received signal in a integrated circuit consistent with an embodiment of the present invention.

FIG. 4 illustrates a timing sequence that may be used to automatically adjust the phase shift between a strobe signal and a received signal in a integrated circuit consistent with an embodiment of the present invention. A training or test data pattern 410 is received. The strobe signal is shifted through a window in discrete steps from a minimum to a maximum delay. For example, the strobe delay may be varied from 60 degrees to 120 degrees. Alternately, other windows may be used. In one embodiment of the present invention, data is received at approximately a 1 GHz data rate. Each step is approximately 10 ps, though some steps may be larger, particularly those steps not close to 90 degree phase shift.

At each step 420 in the window, it is determined whether the training sequence is correctly received. If the data is not correctly received, a fail state is associated with that step. If the data is correctly received, a pass state is associated with that step. In a specific embodiment of the present invention, the first step tested is when the DQS signal is at the step indicated as 420, and subsequent steps are tested in order.

The first step where a pass occurs is stored, in this example step 450 is stored. The last step where a pass occurs is also stored, in this case step 460. Steps 450 and 460 are averaged, in this case resulting in step 430, and the strobe signal is aligned at that position. In this particular example, the "ideal" step 430 varies from the 90 degree phase shift step 440.

Figure 5:
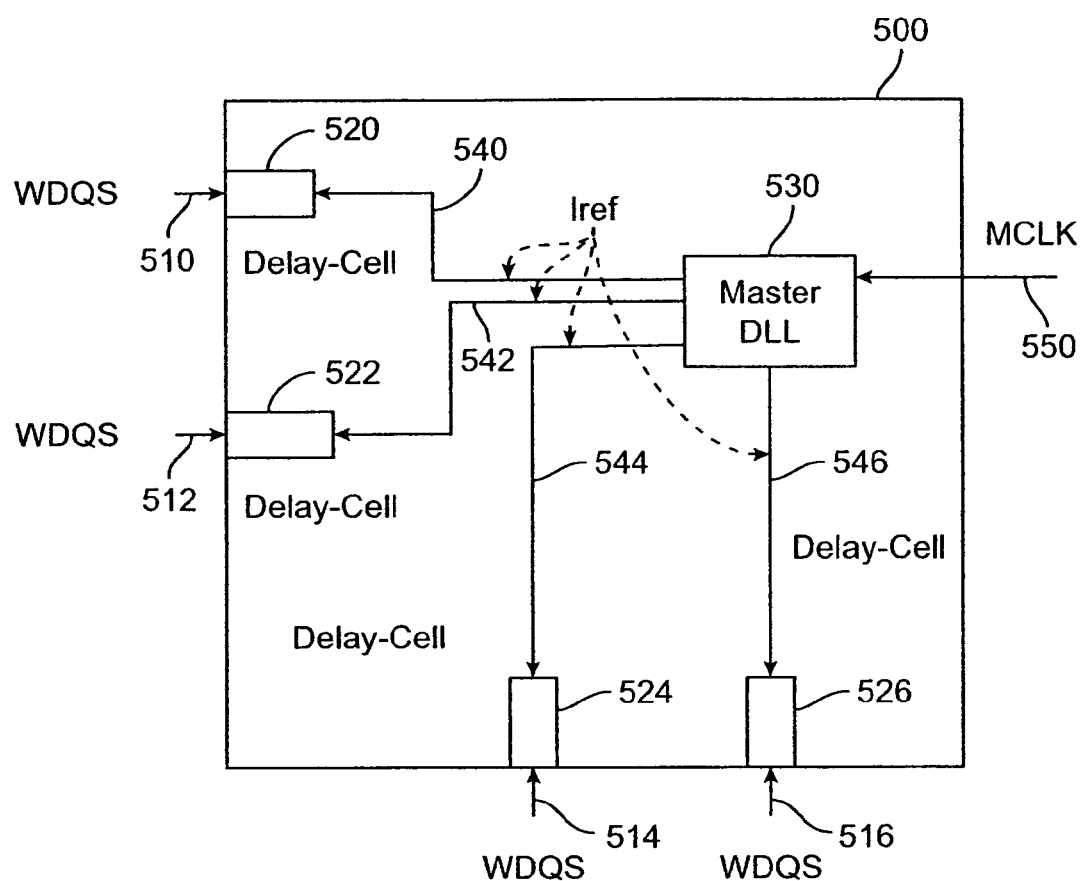
FIG. 5 is a block diagram of an integrated circuit 500 incorporating an embodiment of the present invention.

FIG. 5 is a block diagram of an integrated circuit 500 incorporating an embodiment of the present invention. Included are delay cells or circuits 520, 522, 524, and 526, and master delay locked loop (DLL) 530. A master clock signal is received on line 550 by the master DLL 530. The master DLL provides reference currents on line 540, 542, 544, and 546, to the delay cells 520, 522, 524, and 526. The delay cells 520, 522, 524, and 526, delay the strobe signals received on lines 510, 512, 514, and 516.

Figure 6:
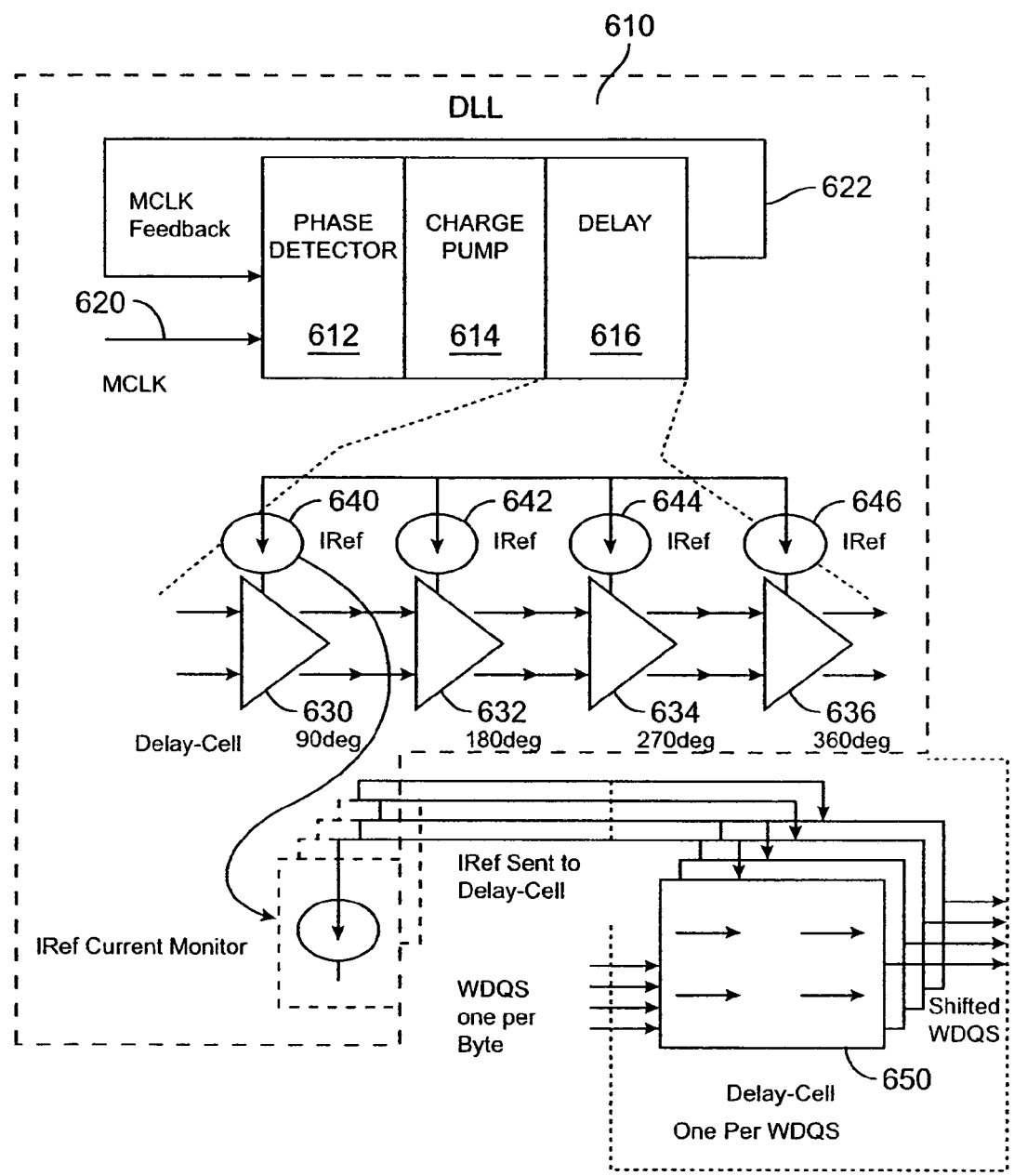
FIG. 6 is a schematic showing the master DLL and delay lines of FIG. 5 in more detail.

FIG. 6 is a schematic showing the master DLL and delay lines of FIG. 5 in more detail. Included in the master DLL 610 are a phase detector 612, charge pump 614, and delay line 616. The delay line 616 includes delay cells 630, 632, 634, and 636, which are biased by reference currents provided by current sources 640, 642, 644, and 646. The reference currents are provided to delay cells 650, which delay the strobe signals.

The master clock signal on line 620 is received by the phase detector 612, which compares it to the output of the delay line on line 622. The phase detector increases or decreases currents in the delay line 616 using the charge pump 614. The delay line 616 provides a 360 degree phase shift to the master clock signal on line 620. Accordingly, each of the reference currents provided by current sources 640, 642, 644, and 646, are such that the delay elements 630, 632, 634, and 636 each provide 90 degrees of phase shift.

The delay elements 630, 632, 634, and 636, maybe be differential pairs having currents provided by the current sources 640, 642, 644, and 646, or they may be another appropriate type of circuit.

The reference currents provided by current sources 640, 642, 644, and 646, are mirrored and provided to the delay cells 650. The delay cells 650 accordingly provide a 90 degree phase shift to the strobe signals. This 90 degree phase shift is adjusted by the training sequence described herein.

Figure 7:
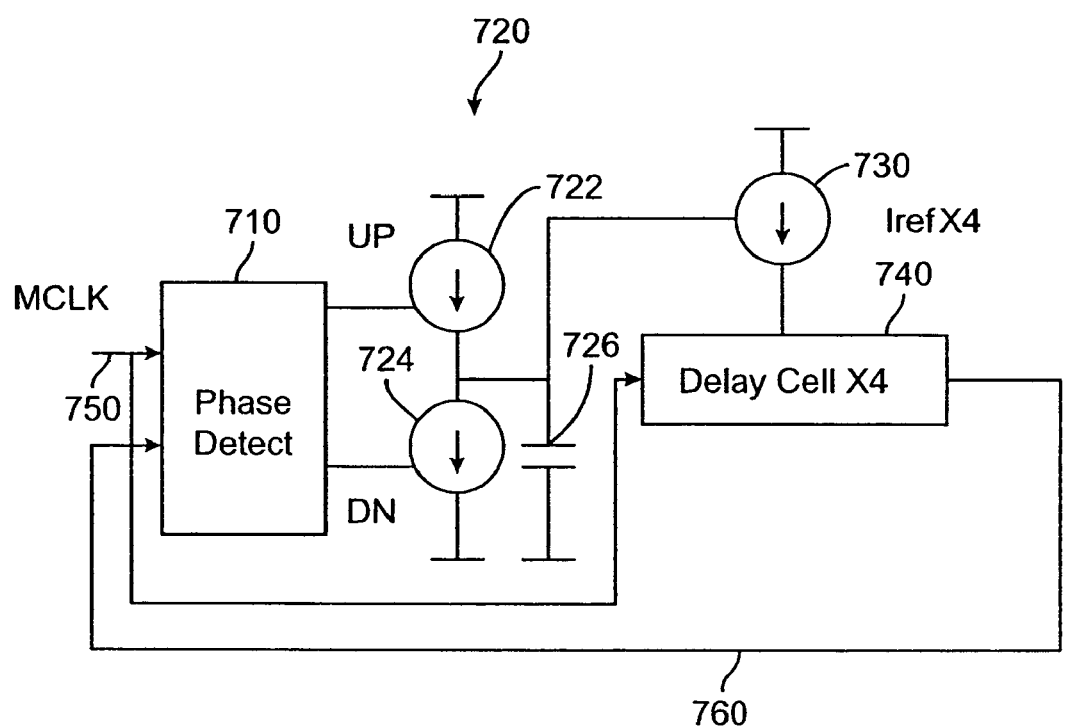
FIG. 7 is a block diagram illustrating a master DLL that may be used as the master DLL 610 in FIG. 6 or as a master DLL in other embodiments of the present invention.

FIG. 7 is a block diagram illustrating a master DLL that may be used as the master DLL 610 in FIG. 6 or as a master DLL in other embodiments of the present invention. Included are a phase detector 710, charge pump 720, reference current sources 730, and delay cells 740. The charge pump 720 includes charge up current source 722, charge down current source 724, and capacitor 726.

The master clock signal is received on line 750 by the phase detector 710 and delay line or delay cells 740. When this circuit is locked the delay cells delay the master clock signal by 360 degrees and provide an output to the phase detector on line 760. If there is a phase difference or error between the signals on lines 750 and 760, the phase detector 710 generates charge up or down signals to the current sources 722 and 724. The changes in these current sources provide a changing voltage across the capacitor 726, which in turn adjusts the currents provided by current sources 730. Again, the current provided by these current sources 730 is mirrored and provided to the individual delay cells that are used to provide the 90 degree phase shift to the strobe signals.

Figure 8:
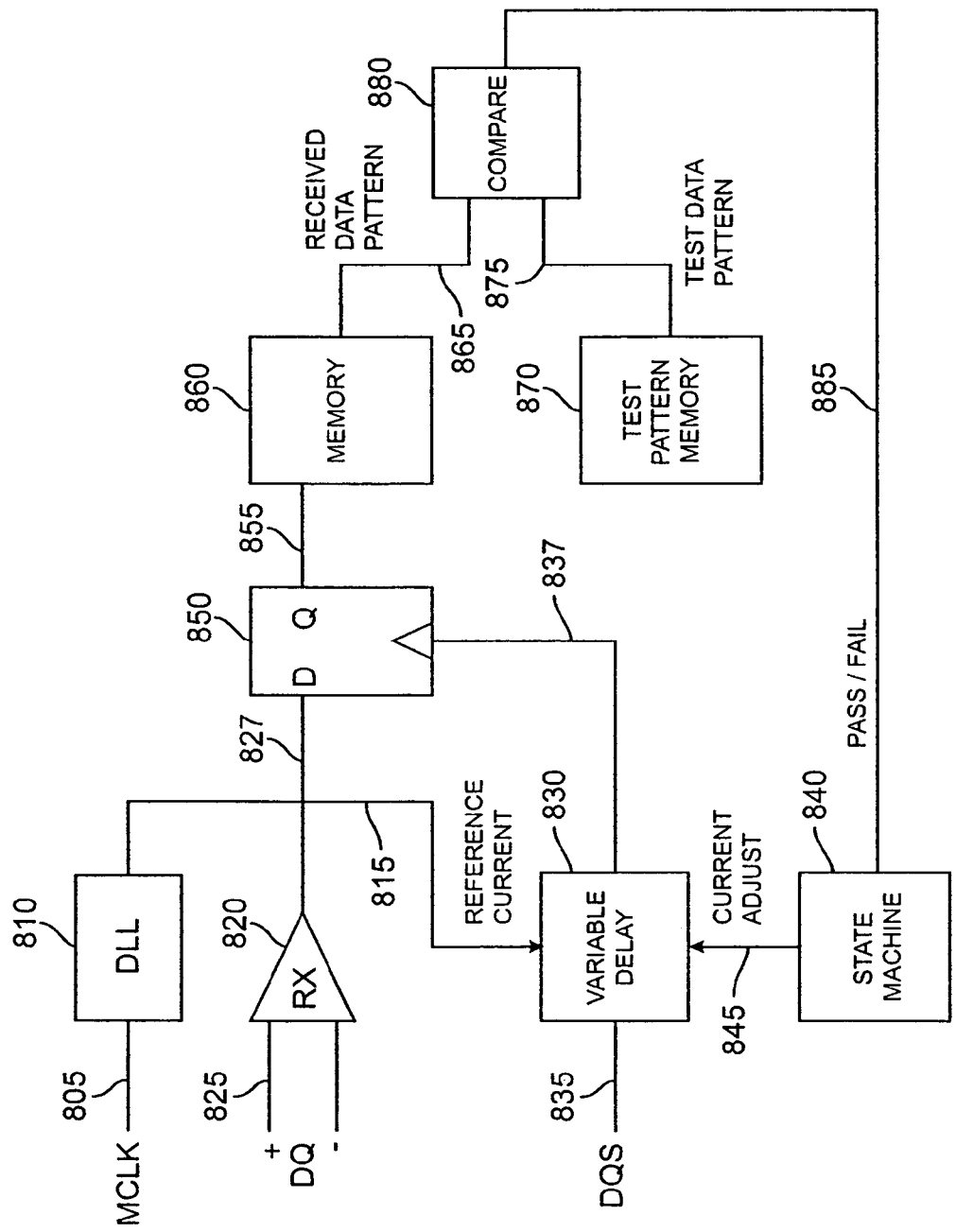
FIG. 8 is a block diagram of the portion of an integrated circuit consistent with an embodiment of the present invention.

FIG. 8 is a block diagram of the portion of an integrated circuit consistent with an embodiment of the present invention. Included are a delay locked loop 810, a line receiver 820, variable delay 830, state machine 840, retiming circuit 850, memory 860, test pattern memory 870, and compare circuit 880.

Data is received on lines 825 by the receiver 820, which in turn provides an output on line 827 to the retiming circuit 850. The retiming circuit 850 may be a flip-flop, FIFO, or other appropriate structure. In various embodiments of the present invention, the retiming circuit 850 is a FIFO that is between 10 and 20 bits deep. Alternately, different depth FIFOs may be used.

A strobe signal DQS is received on line 835 by the variable delay circuit 830. The variable delay circuit delays the strobe signal and provides a clock signal on line 837 to the retiming circuit 850. The retiming circuit 850 provides received data on line 855 to the memory 860. The memory 860 stores a number of bits which form a received data pattern.

The test pattern memory 870 provides the correct pattern, which is the pattern sent to the receiver 820, to the compare circuit 880. The test pattern memory may be separate from the integrated circuit, or it may be included on the integrated circuit. The compares circuit 880 compares the received data pattern on line 865 to the known good test data pattern on line 875. If these two data patterns match, a pass signal is provide on line 885 to the state machine 840. If the patterns do not match, a fail signal is provided on line 885 to the state machine 840.

The state machine 840 adjusts the current provided to the variable delay element 830. In a specific embodiment of the present invention, the current on current adjust line 845 starts at a maximum and is decreased in discrete steps. Accordingly, the delay provided by the variable delay element starts at a minimum and increases to a maximum duration.

In a specific embodiment of the present invention, the current adjust on line 845 is changed in discrete steps. At each discrete step, a test or training pattern is received on line 825 by the receiver 820. At each step, it is determined whether the test or training pattern has been correctly or incorrectly received. As above, the first and last steps where the training pattern is received correctly are retained by the state machine 840. In a specific embodiment, these two steps are averaged, and the corresponding current is provided on the current adjust line 845 to the variable delay element 830. In other embodiments, other algorithms than averaging, for example wieghted averaging may be used.

As before, a master clock signal is received on line 805 by the DLL 810, which provides a reference current on line 815 to the variable delay element 830. The reference current on line 815 is the current necessary such that the variable delay element 830 provides a 90 degree phase shift. The current adjust on line 845 varies this current accordingly.

Figure 9:
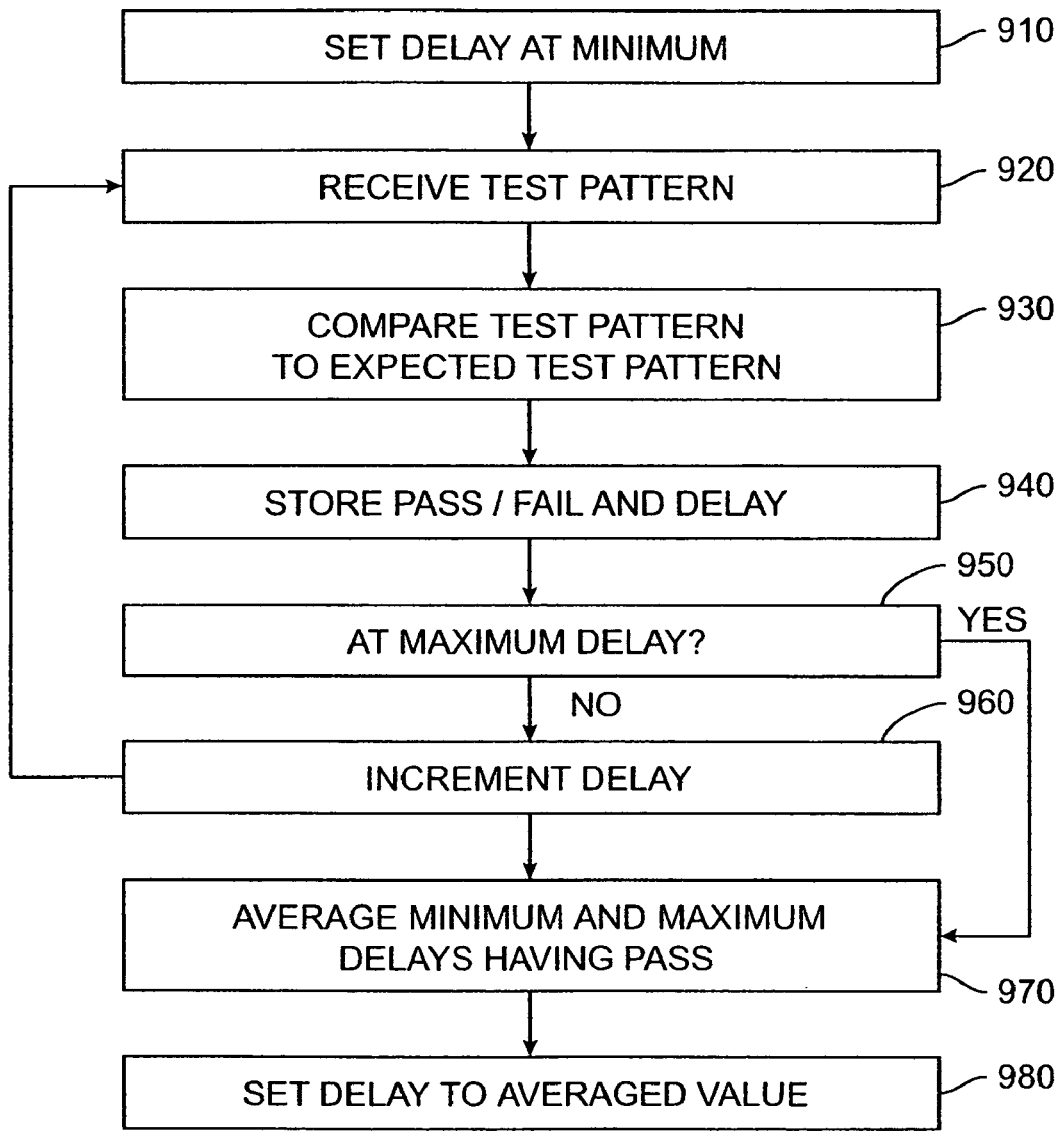
FIG. 9 is a flowchart of a method of adjusting a variable delay using a training sequence in a manner consistent with an embodiment of the present invention.

FIG. 9 is a flowchart of a method of adjusting a variable delay using a training sequence in a manner consistent with an embodiment of the present invention. In act 910, the delay through a variable delay element that is used to delay a strobe signal is set at a minimum. In act 920, a test pattern or training sequence is received at a data input. In act 930, the received test pattern is compared to an expected received test pattern, and in act 940, a pass or fail flag or indication is stored.

In active 950, it is determined whether the delay is at its maximum. If it is not, the delay is incremented, and another test pattern is received in act 920. If the maximum delay has been reached, the minimum and maximum delays having a pass flag associated with them are averaged in act 970, and this average value is used to set the delay of the variable delay element in act 980.

It will be appreciated by one skilled in the art that variations to this flow may be made consistent with embodiments of the present invention. For example, the step size may change each time the delay is incremented. For example, steps away from 90 degrees may be larger than those close to 90 degrees, since the correct delay is likely to be close to 90 degrees, and thus more resolution is desirable there. Also, the number of bits, or number of training sequences may change depending on step location. Also, the determination of what constitutes a pass or a fail may vary. For example, 100 percent may be required, or a simple or super majority may be the test.

The training pattern used by a specific embodiment is a concatenation of the pattern given below. The pattern covers most of the cases of worst case ISI generated due to lonely one, lonely zero, high freq and sub harmonic frequency of the data rate. Other embodiments of the present invention may use other training patterns, and the number of bits in the training pattern may vary.

01 01
011 011
0111 0111
01111 01111
001 001
0011 0011
00111 00111

001111 001111
0001 0001
00011 00011
000111 000111
0001111 0001111
00001 00001
000011 0000

The above description of exemplary embodiments of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications to thereby enable others skilled in the art to best utilize the invention in various embodiments and with various modifications as are suited to the particular use contemplated.

What is claimed is:

1. A method of phase shifting a strobe signal comprising:
   setting a variable delay at a first duration;
   receiving the strobe signal;
   delaying the strobe signal by the first duration;
   receiving a first test pattern;
   comparing the received first test pattern to an expected test pattern to determine the presence of errors; and
   changing the variable delay to a second duration.

2. The method of claim 1 further comprising:
   receiving the strobe signal;
   delaying the strobe signal by the second duration;
   receiving a second test pattern;
   comparing the received second test pattern to an expected test pattern to determine the presence of errors.

3. The method of claim 2 further comprising:
   changing the variable delay over a range of delays in discrete increments;
   at each increment, receiving and delaying the strobe signal by the delay;
   receiving a test pattern; and
   comparing the received test patterns to an expected test pattern to determine the presence of errors.

4. The method of claim 3 further comprising:
   determining the minimum delay where no errors are determined; and
   determining the maximum delay where no errors are determined,
   wherein the minimum delay where no errors are determined and the maximum delay where no errors are determined are used to determine a delay for the strobe signal.

5. The method of claim 4 wherein the minimum delay where no errors are determined and the maximum delay where no errors are determined are averaged, and the average is used to delay the strobe signal for data recovery.

6. The method of claim 5 wherein the method is used by a double-data rate memory interface.

7. A method of phase shifting a strobe signal comprising:
   varying a delay used to phase shift the strobe signal in a plurality of steps;
   at each step, receiving a training pattern;
   at each step, determining if the training pattern was correctly received;
   determining a minimum and maximum delay where the training pattern was correctly received; and
   from the minimum and maximum delay where the training pattern was correctly received, setting the delay.

8. The method of claim 7 wherein the minimum and maximum delay where the training pattern was correctly received are averaged.

9. The method of claim 7 wherein the determination of whether the training pattern was correctly received is made by comparing the received training pattern to an expected received training pattern stored in memory.

10. An integrated circuit comprising:
    a receive buffer configured to receive a data signal;
    a delay circuit configured to delay a strobe signal;
    a retiming circuit configured to retime the received data signal to the delayed strobe signal; and
    a logic block configured to determine whether the data signal was correctly received; and
    a state machine configured to set a delay of the delay circuit based on the determination of whether the data signal was correctly received.

11. The integrated circuit of claim 10 wherein the delay circuit provides a variable delay, the delay determined by the state machine.

12. The integrated circuit of claim 11 further comprising a memory for storing an expected received test pattern.

13. The integrated circuit of claim 12 further comprising a comparison circuit configured to compare a received test pattern to the stored expected received test pattern.

14. The integrated circuit of claim 11 wherein the integrated circuit is a graphics processor.

15. The integrated circuit of claim 11 wherein the state machine varies the delay of the delay circuit through a plurality of discrete delays, and at each delay a test pattern is received.

16. The integrated circuit of claim 15 wherein for each discrete delay, a received test pattern is compared to an expected received test pattern stored in a memory.

17. The integrated circuit of claim 16 wherein the variable delay is varied from a minimum and a maximum, and the comparison between the received test pattern and expected received test pattern is used to determine the presence of errors at each discrete delay.

18. The integrated circuit of claim 17 wherein the state machine stores the minimum and maximum delays where no errors are detected.

19. The integrated circuit of claim 18 wherein the state machine averages the minimum and maximum delays where no errors are detected.

20. The integrated circuit of claim 19 wherein the averaged value is used to retime received data.

* * * * *